United States Patent [19]

Henningsson

[11] 4,285,619
[45] Aug. 25, 1981

[54] SURFACE MACHINING METHOD AND A MACHINE FOR PERFORMING THE METHOD

[75] Inventor: Filip Henningsson, Grästorp, Sweden

[73] Assignee: Frammestads Smides & Mek. Verkstad AB, Nossebro, Sweden

[21] Appl. No.: 85,209

[22] Filed: Oct. 16, 1979

[30] Foreign Application Priority Data

Oct. 25, 1978 [SE] Sweden ................... 7811071

[51] Int. Cl.³ .................. B23B 35/00; B23B 39/00
[52] U.S. Cl. ............................... 408/1 R; 408/88
[58] Field of Search .................. 408/1, 88, 91, 187

[56] References Cited

U.S. PATENT DOCUMENTS

| | | | |
|---|---|---|---|
| 2,844,053 | 7/1958 | Wagner et al. | 408/88 |
| 3,120,136 | 2/1964 | Bieker | 408/1 |
| 3,806,271 | 4/1974 | Ishiguro et al. | 408/187 |
| 3,814,535 | 6/1974 | Steiner | 408/187 |
| 3,837,757 | 9/1974 | Levine | 408/88 |
| 4,061,436 | 12/1977 | Durrer | 408/88 |

*Primary Examiner*—Harrison L. Hinson
*Attorney, Agent, or Firm*—Holman & Stern

[57] ABSTRACT

When machining surfaces of workpieces, which are not directly accessible for the working tool, for instance due to projecting flanges or inclined wall surfaces, a back-working tool is used, comprising a rotatable spindle carrying a cutter means. The workpiece is located upon a table with its accessible face turned downwards, the driving component of the machine is located below the table, and the spindle is made to extend through an opening in the working table and a passage in the workpiece, to present the cutter means at the, normally, non-accessible face of the workpiece. During operation the cutter means is brought to exert a downwardly directed pressure upon the workpiece, which is transferred to, and taken up by the working table.

4 Claims, 3 Drawing Figures

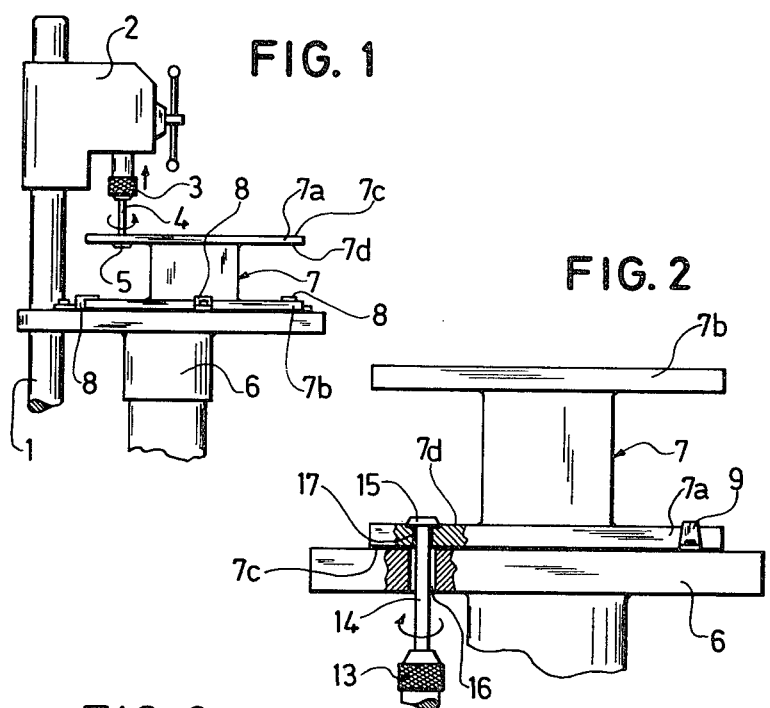

SURFACE MACHINING METHOD AND A MACHINE FOR PERFORMING THE METHOD

BRIEF SUMMARY OF THE INVENTION

The present invention refers to a method of machining, especially backplaning or countersinking a surface adjacent to the mouth of a passage and not being directly accessible, as well as a machine for working the method.

Back-working tools of various types have been used for this kind of machining, the simplest being provided with a fixed cutting means. This will, in use, have to be attached to the tool spindle, which from a chuck at the working machine, located above the workpiece, extends through a bore or a passage in the workpiece. A drawback when using tools of this type is that it will be necessary to secure the workpiece thoroughly at the working table, preferably at least at three points, in order to prevent the workpiece being lifted up from the table, when the cutter means, from below, is pressed against the surface to be machined.

Operations of this type often involves machining of one or a few surfaces in each object of a long series of similar workpieces. The work involved in locating and removing of the workpieces is considerable, and meanwhile the machine is not producing.

When indexing between passages in the same workpiece, and when a new workpiece is to be fitted instead of a finished one, it is necessary that the spindle be brought to standstill before the cutter means can be removed.

There are other, more complicated back-planing tools, which are provided with a permanent cutter means, being swingably mounted at the spindle, and is brought into, and out of operating position by the centrifugal action, depending upon the direction of rotation of the spindle.

With this type of tool the cutter means will remain at the spindle during a series of operations, as it is possible to move the spindle, with the cutter means folded-in, down and up through the passages, as required. The need for a thorough securing of the workpiece upon the table remains also with this type of tool, which is considerable more complicated and expensive than a tool with a fixed cutter means.

The aim of the present invention is to propose a simplified method of machining workpieces of the kind referred to, whereby the time involved in securing the workpiece may be drastically reduced.

A method according to the invention is characterized in providing a working table having an opening therein, locating the workpiece upon said table with its non-accessible side turned upwards and with the passage therein aligned with the opening in the table, introducing, from below, a spindle adapted to carry a cutter means and rotatable by said driving component through said opening and said passage, and machining the surface while maintaining a downwardly directed pressure upon the workpiece.

A machine for working the method comprises a working table having at least one opening and adapted to receive the workpiece with the non-accessible surface turned away from the table, and with the passage aligned with the opening, means for mounting the driving component below said table, a spindle rotatable by said driving component and of sufficient length to reach through said opening and said passage, and further means for causing a cutter tool carried by said spindle to exert a downwardly directed pressure upon the working table by way of the workpiece.

The working table is preferably provided with adjustable stop means for preventing rotation of the workpiece about the spindle.

BRIEF DESCRIPTION OF THE SEVERAL VIEWS OF THE DRAWING

FIG. 1 shows an elevation of part of a machine adapted for back-planing according to conventional methods, FIG. 2 shows, on a larger scale, the basic way of operating according to the invention, and FIG. 3 shows part of a machine according to the invention.

DETAILED DESCRIPTION

FIG. 1 shows part of a boring machine stand 1 carrying a driving component 2 provided with a vertically displaceable chuck 3 into which a spindle 4 is fitted. A cutter means 5 is removably attached to the spindle.

A flanged workpiece 7 is located upon a working table 6 provided below the driving machine, and is rotatable, as well as vertically adjustable. A number of bores (not shown) are made in a flange 7a, and it is desirable to machine the surfaces around the mouths of these bores, at the face 7d of the flange, which is not directly accessible from the driving component, due to a further flange 7b. The opposite face, 7c, of flange 7a is, however, accessible. According to conventional methods the workpiece 7 is located upon the table with its accessible face 7c turned upwards. It will then be necessary to secure the workpiece rigidly upon the table, which for instance may be brought about by means of clamps 8, which are screwed into the table. When the back-planing tool has been brought into the position shown in the drawing, the driving component 2 is started, whereby the spindle 4 and the cutter means are rotated in the direction indicated by the arrow. In order to make the cutter means 5 operative it is necessary that it is made to exert an upwardly directed force upon face 7d, which means that the workpiece 7 would be lifted from the table if it was not safely secured. FIG. 2 shows a simplified elevation of a working table 6 for operation according to the invention. A workpiece 7, having flanges 7a, and 7b of basically the same shape as the one shown in FIG. 1, and requiring the same kind of machinery, is located upon a table 6. As in FIG. 1 a back-planing is to be performed at the nonaccessible face 7d of flange 7a. Contrary to the manner used with the conventional method according to FIG. 1 the workpiece 7 will be located with flange 7a turning its accessible face 7c towards the working table 6. The workpiece 7 will not have to be securely locked to the table, since it is sufficient to prevent rotation in relation to the spindle 14 by means of a suitably located stopper 9.

The spindle 14 extends from below through an opening 16 in the work table, as well as through the passage 17 in the workpiece, and the only adjustment necessary is to bring the passage into proper alignment with the opening in the work table.

In order to bring about the desired working upon the surface surrounding the mouth of passage 17 it is necessary to press the cutter means 15 carried by the spindle 14 against the non-accessible surface 7d at the workpiece 7. The driving member of the spindle will have to be located below the working table and the pressure will be transferred to the working table 6. It will therefore be unnecessary to attach the workpiece in a manner to avoid lifting from the work table, whereby a considerable reduction in the time required in fitting the workpiece is attainable.

When using cutter means attachable by means of a bayonet fitting to the spindle 14, when this has been brought through opening 16 and passage 17, it is possible to fit and to remove the cutter means by simply reversing the direction of rotation of the spindle.

FIG. 3 shows a machine according to the invention, the same reference numerals as in FIG. 1 being used whenever possible. The driving component 2 is vertically slidable upon the pillar 1 of the stand and may be locked in any desired position by a handle 20. The table 6 is likewise vertically adjustable and will be locked by a handle 21. The chuck 13 is adjustable for the necessary downward pressure by means of a hand-wheel 22. The driving motor is indicated by 23.

By this arrangement it is possible to considerably reduce the operating time, while it also will be more easy to superwise the machining.

The embodiment shown must be regarded as an example only, most adjusting operations being performed by hand. It is evident that the invention advantageously may be used also with more sophisticated machines having automatic governing of the chuck movement, and indexing for machining several surfaces of the same object, and possibly using cutter means of the centrifugal-action operated type.

What I claim is:

1. A method of machining a surface of a workpiece adjacent to the mouth of a passage in a workpiece where said surface is not directly accessible from the driving component of a working machine, comprising the steps of providing a substantially horizontal working table with an opening therein, locating the workpiece upon said table with its non-accessible surface turned upwards and with the passage therein aligned with the opening in said table, introducing, from below, a spindle adapted to carry a cutter means and rotatable by said driving component through said opening and said passage, and machining the surface while maintaining a downwardly directed pressure upon the workpiece by the cutter of sufficient magnitude to hold said workpiece fixed in relation to said opening.

2. The method according to claim 1 further comrpising holding said workpiece on the table at a position remote from said opening to prevent rotation of the workpiece about the spindle as a center.

3. A machine for back-working a surface of a workpiece adjacent to the mouth of a passage in a workpiece where said surface is not directly accessible from the driving component of the working machine, comprising a substantially horizontal working table having at least one opening and adapted to receive the workpiece with the non-accessible surface turned away from the table, and with said passage aligned with said opening, means for mounting said driving component below said table, a spindle rotatable by said driving component and of sufficient length to reach through said opening and said passage, and means for causing a cutter tool carried by said spindle to exert a downwardly directed pressure upon said workpiece to retain it in position in relation to said opening in said working table.

4. The machine according to claim 3, wherein said working table is provided with adjustable stop means at a position remote from said opening for preventing rotation of the workpiece about the spindle.

* * * * *